United States Patent [19]
Wampfler et al.

[11] 3,833,776
[45] Sept. 3, 1974

[54] WIRE GRIP

[75] Inventors: Manfred Wampfler, D-7859 Markt; Werner Krugel, Haltingen, both of Germany

[73] Assignee: said Wampfler, by said Krugel

[22] Filed: Feb. 1, 1973

[21] Appl. No.: 328,576

[30] Foreign Application Priority Data
Feb. 1, 1972 Germany...................... 2204591

[52] U.S. Cl............. 191/57, 24/81 CC, 248/68 CB, 269/46
[51] Int. Cl.............................................. B60l 5/36
[58] Field of Search .... 24/81 CC, 115 R; 191/12 R, 191/57, 58; 248/68 R, 68 CB, 67.5; 269/2, 46, 43, 97, 287

[56] References Cited
UNITED STATES PATENTS

| | | | |
|---|---|---|---|
| 2,975,807 | 3/1961 | Wanninger............................ | 174/69 |
| 3,027,419 | 3/1962 | Owen.................................... | 248/68 CB |
| 3,546,400 | 12/1970 | Dechantsreiter................... | 191/12 R |
| 3,743,762 | 7/1973 | Annas.................................. | 24/81 CC |

FOREIGN PATENTS OR APPLICATIONS

| | | | |
|---|---|---|---|
| 538,730 | 8/1941 | Great Britain.................. | 248/68 CB |

*Primary Examiner*—Roy Lake
*Assistant Examiner*—Mark S. Bicks
*Attorney, Agent, or Firm*—Pollock, Philpitt & Vande Sande

[57] ABSTRACT

Wire gripping means which may be used at a cable carriage such as is used in guiding and supporting a plurality of wires feeding power to a moveable electric machine such as a travelling crane. Each wire gripping means comprises two strips which are spaced a predetermined position from each other by a distance at least as great as the diameter of the largest wire to be supported. One wire is clampingly engaged by wire gripping means, and this serves the purpose of moving the cable carriages either closer or further apart from each other. Additional wires are held loosely between the strips so that they can shift their position relative to each other along the direction of their axes. This arrangement ensures that the wire loops which are formed between carriages can be freely formed dependent upon the stiffness of the wires and their diameters in contrast with prior art gripping means which tightly clamps the various wires so that the different wires form different curves and have a tendency to bend in diverse ways.

12 Claims, 1 Drawing Figure

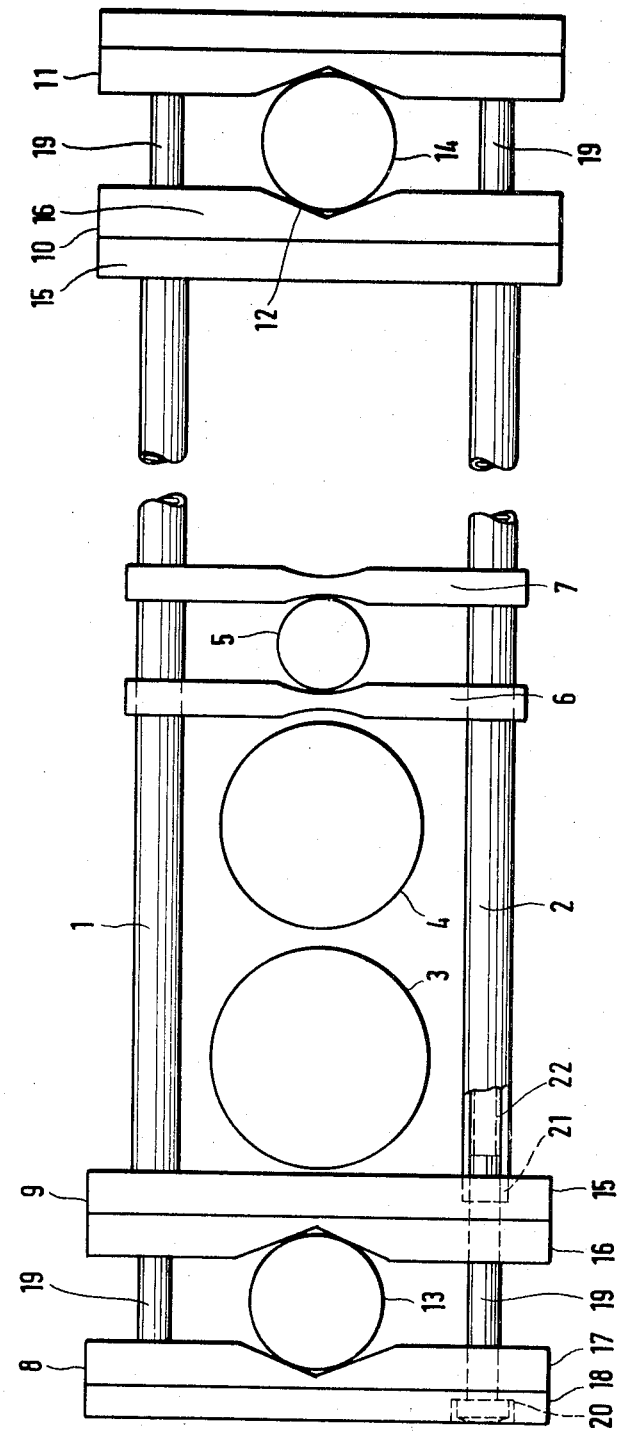

WIRE GRIP

BACKGROUND OF THE INVENTION

The invention relates to a wire grip for the control of wire loops between cable carriages, whereby the wires are guided and held relative to each other by two strips which are connected with each other. Wire grips of this type are used to prevent a dislocation of the wire loops between the cable carriages.

Known wire grips comprise two terminal strips, with the wires of diverse diameters being clamped between these strips. For this purpose, the terminal strips are provided with bores according to wire diameters and wire distribution, the diameters of the bores being slightly smaller than the diameters of the wires to be clamped. The placement of the bores follows the pattern of the wire distribution. The terminal strips clamp in the direction of the plane which is formed by the various wires.

These known terminal strips which consist of hardwood and which are reinforced by aluminum strips, have various disadvantages. Since the bores are always made to match specific wire diameters and are arranged to fit the wire distribution, the wire grips can be used only for the wiring for which they were specifically prepared. In addition to the time-consuming matching process, there exists the great disadvantage that in case of the addition of more wires, the original wire grip cannot accomodate the new wires, making it necessary to use and fit a new wire grip. In other words, these wire grips are not usable universally.

These known wire grips prevent a dislocation of the wire loops only to an insufficient degree. Due to the great difference in wire diameters, the loops of the various wires have a tendency to bend in diverse ways. Since all the wires are held by the grip, a variety of curves will form above and below the wire grip, and will also cause the wire grip to tilt if the wires are not arranged symmetrically relative to their diameters. The known wire grips have the additional disadvantage that the screws which connect the two terminal strips with each other will protrude, at least partially, at the front side of the terminal strips, with the result that during the movements of the cable carriages the protruding parts will rub against the adjacent wires.

SUMMARY OF THE INVENTION

The above described disadvantages are avoided by means of this invention. This is accomplished according to the invention in case of a wire grip of the type discussed above in such manner that the wire grip is held clampingly by at least one wire while the other wires run without restraint between the strips and can shift relative to each other and to the strips at least in direction of their axes. The strips are designed preferably in such manner that the wires, located between the strips, can incline relative to the plane formed by the two strips.

This arrangement ensures that the wire loops will form uniformly, i.e. they can form loops that are determined by the stiffness of the wires as well as by their diameters. The desired uniform alignment of the wires is thus guaranteed, and any tilting of the wire grip becomes impossible. If care is taken that the free spacing between the terminal strips is greater than the diameter of the thickest free-running wires, the wire grip can then be used for wires of any diameter and any wire distributions. Therefore, if new wires are being added to existing wires, these new wires can be conducted through the wire grip without the need of special adjustments.

The wire grip proposed by the invention has the additional advantages that it is light-weight and that the clamping means for the wire to be clamped can be arranged and designed in such manner that any rubbing effect during movement of the cable carriages will be avoided.

BRIEF DESCRIPTION OF THE DRAWING

The drawing shows one species of the wire grip as proposed by the invention.

DETAILED DESCRIPTION OF THE PREFERRED EMBODIMENT

The wire grip comprises two strips 1, 2 which run parallel to each other and which are preferably tubular. Several wires, which can shift in their axial direction relative to each other and relative to the two strips, run freely between these two strips 1, 2. For reasons of clarity, the drawing depicts the wires 3, 4, 5. The distance between the two strips 1, 2 is determined by the spacers 9, 10 at the two ends. Each spacer 9 or 10 comprises parts 15 and 16. These spacers 9, 10 are provided with mating apertures 21, into which the ends of the strips 1, 2 can be inserted. The spacers 9, 10 serve simultaneously as jaws for outwardly arranged clamping devices. One such clamping device comprises the jaw 8 (formed of parts 17 and 18) and the spacer 9 and the other clamping device consists of the spacer 10 and the jaw 11. The wire 13 is clamped by the clamping device 8, 9, with the clamping effected by the screws 19 which are screwed into strip 1 and 2 respectively. For this purpose, the jaw part 18 is provided with two indentations 20 to accomodate the screw heads. The strips 1, 2 are each provided with female threads 22 to hold screws 19.

Parts 15 and 18 of the two jaws 8, 9 are made preferably of metal, while the clamping parts 16, 17, which come in contact with the wire 13, are preferably formed of a resilient material. Parts 16, 17 are each provided with a wedge-shaped slot 12 — illlustrated in case of part 16 at the opposite side. Preferably, that portion of part 15 which faces the wire 3 is also provided with a resilient coating.

The clamping device 10, 11, located at the right side, is preferably designed identically with the clamping device 8, 9 located at the left side. The drawing shows clearly that the clamping devices 8, 9, and 10, 11 respectively, are able to clamp wires 13, 14 although they differ in diameter. There is no need to adapt the clamping device or devices to the diameter of the wire to be clamped. The lateral clamping, which is used here, ensures that the screws 19 will not protrude in the direction of adjacent portions of wire.

In the case of the illustrated embodiment, it is shown clearly that the wires 3, 4 will run freely. If wires of very small diameter are carried at the same time, such as wire 5 for example, it will be expedient to employ spacers 6, 7. However, these spacers 6, 7 do not clamp the wire 5 but are used solely to prevent any entanglement of the thin wire 5 with the wire 4. The spacers 6, 7 are provided with bores on each side and can thus be pushed onto the tubular strips 1, 2.

The most significant feature of the wire grip proposed by the invention is the unobstructed guidance of the wires 3, 4, 5 between the strips. Designs other than the species shown are also feasible. For example, it is possible to provide one single clamping device for a wire running at the center, with the guide strips extending on both sides of such clamping device, and being connected with each other at their outer ends.

I claim:

1. Wire grip apparatus for the control of wire loops between cable carriages comprising, at least two parallel strip members, means for supporting said strips at a predetermined distance from each other, first support means supported by said parallel strip members defining a first wire receiving aperture which grippingly engages at least one wire extending between said parallel strip members, and second support means also supported by said parallel strip members defining at least one second wire receiving aperture which receives at least one second wire without restraint between said parallel strip members.

2. The apparatus of claim 1 in which said first and second support means permit said second wires to be inclined relative to the plane formed by said parallel strip members.

3. The apparatus of claim 1 wherein said second support means defines smooth surfaces over those portions thereof contacting said second wires.

4. The apparatus of claim 1 wherein the spacing between said parallel strip members exceeds the diameter of the largest of said second wires.

5. The apparatus of claim 1 wherein said parallel strip members are of circular cross-section.

6. The apparatus of claim 1 wherein each said first support means comprises a pair of jaw members supported on said parallel strip members.

7. The apparatus of claim 6 wherein one of said jaw members comprises one of said support members which maintains said parallel strip members in their said parallel relationship.

8. The apparatus of claim 6 wherein said first support means comprises two pairs of jaw members, each said pair being supported by said parallel strip members at opposite ends thereof.

9. The apparatus of claim 8 wherein the outer jaw member of each pair is bolted to said parallel strip members.

10. The apparatus of claim 8 wherein at least one said jaw member defines a V-shaped slot on its wire-gripping surface.

11. The apparatus of claim 8 wherein the wire-gripping surfaces of said jaw members have a resilient coating.

12. The apparatus of claim 1 wherein said second supporting means includes additional spacer members supported on said parallel strip members for separating selected ones of said second wires from other of said second wires.

* * * * *